(12) United States Patent
Okada et al.

(10) Patent No.: US 6,810,393 B2
(45) Date of Patent: Oct. 26, 2004

(54) INFORMATION PROCESSING APPARATUS AND METHOD, AND STORAGE MEDIUM (75) Inventors: Atsushi Okada, Tokyo (JP); Naoki Ohtsuji, Ibaraki (JP); Yoshinori Kato, Tokyo (JP); Masaya Watanuki, Tokyo (JP); Hiroyuki Shiiba, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 229 days.

(21) Appl. No.: 09/821,405

(22) Filed: Mar. 29, 2001

(65) Prior Publication Data
US 2001/0039542 A1 Nov. 8, 2001

(30) Foreign Application Priority Data
Mar. 31, 2000 (JP) ........................................ 2000-099537

(51) Int. Cl.⁷ ............................ G06F 17/30; G06F 7/30
(52) U.S. Cl. .......................................................... 707/3
(58) Field of Search ............................................ 707/3

(56) References Cited
U.S. PATENT DOCUMENTS

| | | | | |
|---|---|---|---|---|
| 5,548,756 A | * | 8/1996 | Tantry et al. .................. 707/10 |
| 5,570,291 A | * | 10/1996 | Dudle et al. ................... 700/95 |
| 5,799,286 A | * | 8/1998 | Morgan et al. ................ 705/30 |
| 5,946,665 A | * | 8/1999 | Suzuki et al. ................. 705/26 |
| 6,009,422 A | * | 12/1999 | Ciccarelli ....................... 707/4 |
| 6,256,773 B1 | * | 7/2001 | Bowman-Amuah ......... 717/121 |
| 6,351,745 B1 | * | 2/2002 | Itakura et al. ................. 707/10 |
| 6,411,862 B1 | * | 6/2002 | Hazama et al. ............. 700/182 |
| 6,487,557 B1 | * | 11/2002 | Nagatomo ................... 707/102 |
| 6,493,675 B1 | * | 12/2002 | Kanaya et al. ................. 705/7 |

* cited by examiner

Primary Examiner—Wayne Amsbury
Assistant Examiner—Cindy Nguyen
(74) Attorney, Agent, or Firm—Morgan & Finnegan LLP

(57) ABSTRACT

A search condition is accepted (S803), a search module which matches that search condition is generated (S809), and a database is searched for data (S810, S811, S812). The database search results by the search modules are acquired (S813), and are saved in a memory (S815). This invention allows to efficiently search distributed databases for required data alone.

16 Claims, 11 Drawing Sheets

INFORMATION PROCESSING APPARATUS AND METHOD, AND STORAGE MEDIUM

FIELD OF THE INVENTION

The present invention relates to an information processing system which efficiently searches individual databases distributed in a system for processing information for predetermined information corresponding to the purpose of a job to be executed and processed by the system as a whole, acquires the information, and executes an information process such as a change process or the like, an information processing method for implementing the search process, and a computer readable storage medium that stores a program for making a computer implement that method.

BACKGROUND OF THE INVENTION

In a conventional client-server system, data search and change processes are mainly done based on a keyword designated for each data. Such search and change processes do not pose any problem when data are individually managed. However, data such as production management information which must be managed while covering a plurality of kinds of information such as a delivery date, quantity, parts specifications, place to deliver, and the like must be individually accessed, resulting in an inefficient data process. In addition, when the contents of production management information are managed by databases distributed on a plurality of servers, and a product is manufactured by exchanging related parts, the conventional search and change processes in units of individual data have limitations if all data must be appropriately searched out and changed, and data inconsistencies may occur among servers. Therefore, a system that can exhaustively and efficiently search distributed databases for only required data and can change the found data for a predetermined search/change purpose, and its information processing method are demanded.

SUMMARY OF THE INVENTION

In order to achieve an efficient information process as the object of the present invention in consideration of the above situation, the present invention comprises at least the following arrangement.

That is, an information processing apparatus for searching a database for data, comprises:
  accept means for accepting a search condition;
  means for searching the database for data by generating a search module that matches the received search condition;
  reception means for receiving a search result of the database from the search module; and
  control means for controlling storage means to store received data.

Alternatively, an information processing apparatus for searching a database for data, comprises:
  accept means for accepting a search condition;
  means for generating a search module that matches the received search condition;
  means for receiving a search result of the database from the search module; and
  control means for, when the accepted search condition is a search condition transferred from another server, transferring the search result to the server, and for, when the accepted search result is not a search condition transferred from another server, controlling storage means of the self apparatus to store the search result.

Alternatively, an information processing apparatus for searching a database for data, comprises:
  a first server having a first database;
  a second server having a second database;
  input means for inputting a search condition;
  first transfer means for transferring the search condition to the first server on the basis of the input search condition;
  second transfer means for transferring the search condition transferred by the first transfer means from the first server to the second server;
  first search means for generating a search module, that matches the transferred search condition, on the basis of the search condition, and searching the first database for data;
  second search means for generating a search module, that matches the transferred search condition, on the basis of the search condition, and searching the second database for data;
  third transfer means for transferring the data found by the second search means to the first server; and
  control means for controlling storage means to store the data transferred by the third transfer means, and the data found by the first search means.

Alternatively, an information processing apparatus for searching a first server having a first database and a second server having a second database for data, comprises:
  input means for inputting a search condition;
  first transfer means for transferring the input search condition to the first server;
  second transfer means for transferring the input search condition to the second server via the first server; and
  control means for controlling storage means to store data which is found by the first server on the basis of the transferred condition and is transferred from the first server, and data which is found by the second server on the basis of the transferred condition and is transferred from the second server.

Alternatively, an information processing apparatus for searching a database for data, comprises:
  input means for inputting a search condition;
  accept means for accepting the input search condition by a first server;
  specifying means for specifying a server, that saves and manages a search result, on the basis of the accepted search condition;
  means for, when the first server is different from the specified server that saves and manages the search result, switching a server which accepts the search condition to a second server that saves and manages a search result;
  first search means for accepting the switched search condition, generating a search module that matches the search condition, and searching a database in the second server for data;
  transfer means for, when a data search is required in another server other than the second server on the basis of the switched search condition, transferring the search condition to the other server;
  second search means for accepting the transferred search condition, generating a search module that matches the search condition, and searching a database in the other server for data;
  send-back means for sending back data found by the second search means to the second server; and control means for controlling storage means to store the data found by the first search means, and the data sent back from the other server.

In a preferred aspect of an information processing apparatus according to the present invention, the search module is generated for each search condition, and searches a database in a server defined by the search condition for data.

In a preferred aspect of an information processing apparatus according to the present invention, when the search condition designates a change process of data, the search module sends a change request of that data to the database, and acquires identification information indicating completion of the change process as a search result.

In a preferred aspect of an information processing apparatus according to the present invention, when the search condition designates a search process of data, the search module sends a publish request of that data to the database, and acquires public information in response to the publish request as a search result.

An information processing method for searching a database for data, comprises:

the accept step of accepting a search condition;

the step of searching the database for data by generating a search module that matches the received search condition;

the reception step of receiving a search result of the database from the search module; and the control step of controlling storage means to store received data.

Alternatively, an information processing method for searching a database for data, comprises:

the accept step of accepting a search condition;

the step of generating a search module that matches the received search condition;

the step of receiving a search result of the database from the search module; and the control step of transferring, when the accepted search condition is a search condition transferred from another server, the search result to the server, and controlling, when the accepted search result is not a search condition transferred from another server, storage means of the self apparatus to store the search result.

Alternatively, an information processing method for searching a first server having a first database, and a second server having a second database for data, comprises:

the input step of inputting a search condition;

the first transfer step of transferring the search condition to the first server on the basis of the input search condition;

the second transfer step of transferring the search condition transferred in the first transfer step from the first server to the second server;

the first search step of generating a search module, that matches the transferred search condition, on the basis of the search condition, and searching the first database for data;

the storage step of storing the data found in the first search step in storage means;

the second search step of generating a search module, that matches the transferred search condition, on the basis of the search condition, and searching the second database for data;

the third transfer step of transferring the data found in the second search step to the first server; and the control step of controlling the storage means to store the data transferred in the third transfer step.

Alternatively, an information processing method for searching a first server having a first database and a second server having a second database for data, comprises:

the input step of inputting a search condition;

the first transfer step of transferring the input search condition to the first server;

the second transfer step of transferring the input search condition to the second server via the first server; and the control step of controlling storage means to store data which is found by the first server on the basis of the transferred condition and is transferred from the first server, and data which is found by the second server on the basis of the transferred condition and is transferred from the second server.

Alternatively, an information processing method comprises:

the input step of inputting a search condition;

the accept step of accepting the input search condition by a first server;

the specifying step of specifying a server, that saves and manages a search result, on the basis of the accepted search condition;

the step of switching, when the first server is different from the specified server that saves and manages the search result, a server which accepts the search condition to a second server that saves and manages a search result;

the first search step of accepting the switched search condition, generating a search module that matches the search condition, and searching a database in the second server for data;

the transfer step of transferring, when a data search is required in another server other than the second server on the basis of the switched search condition, the search condition to the other server;

the second search step of accepting the transferred search condition, generating a search module that matches the search condition, and searching a database in the other server for data;

the send-back step of sending back data found in the second search step to the second server; and the control step of controlling storage means to store the data found in the first search means, and the data sent back from the other server.

In a preferred aspect of an information processing method according to the present invention, the search module is generated for each search condition, and searches a database in a server defined by the search condition for data.

In a preferred aspect of an information processing method according to the present invention, when the search condition designates a change process of data, the search module sends a change request of that data to the database, and acquires identification information indicating completion of the change process as a search result.

In a preferred aspect of an information processing method according to the present invention, when the search condition designates a search process of data, the search module sends a publish request of that data to the database, and acquires public information in response to the publish request as a search result.

A storage medium stores a program code for making a computer implement an information processing method for searching a database for data, and the program code comprises:

a code of the accept step of accepting a search condition;

a code of the step of searching the database for data by generating a search module that matches the received search condition;

a code of the reception step of receiving a search result of the database from the search module; and a code of the control step of controlling storage means to store received data.

Alternatively, a storage medium stores a program code for making a computer implement an information processing method for searching a database for data, and the program code comprises:

a code of the accept step of accepting a search condition;

a code of the step of generating a search module that matches the received search condition;

a code of the step of receiving a search result of the database from the search module; and a code of the control step of transferring, when the accepted search condition is a search condition transferred from another server, the search result to the server, and controlling, when the accepted search result is not a search condition transferred from another server, storage means of the self apparatus to store the search result.

Alternatively, a storage medium stores a program code for making a computer implement an information processing method for searching a first server having a first database, and a second server having a second database for data, and the program code comprises:

a code of the input step of inputting a search condition;

a code of the first transfer step of transferring the search condition to the first server on the basis of the input search condition;

a code of the second transfer step of transferring the search condition transferred in the first transfer step from the first server to the second server;

a code of the first search step of generating a search module, that matches the transferred search condition, on the basis of the search condition, and searching the first database for data;

a code of the storage step of storing the data found in the first search step in storage means;

a code of the second search step of generating a search module, that matches the transferred search condition, on the basis of the search condition, and searching the second database for data;

a code of the third transfer step of transferring the data found in the second search step to the first server; and a code of the control step of controlling the storage means to store the data transferred in the third transfer step.

Alternatively, a storage medium stores a program code for making a computer implement an information processing method for searching a first server having a first database, and a second server having a second database for data, and the program code comprises:

a code of the input step of inputting a search condition;

a code of the first transfer step of transferring the input search condition to the first server;

a code of the second transfer step of transferring the input search condition to the second server via the first server; and a code of the control step of controlling storage means to store data which is found by the first server on the basis of the transferred condition and is transferred from the first server, and data which is found by the second server on the basis of the transferred condition and is transferred from the second server.

Alternatively, a storage medium comprises:

a code of the input step of inputting a search condition;

a code of the accept step of accepting the input search condition by a first server;

a code of the specifying step of specifying a server, that saves and manages a search result, on the basis of the accepted search condition;

a code of the step of switching, when the first server is different from the specified server that saves and manages the search result, a server which accepts the search condition to a second server that saves and manages a search result;

a code of the first search step of accepting the switched search condition, generating a search module that matches the search condition, and searching a database in the second server for data;

a code of the transfer step of transferring, when a data search is required in another server other than the second server on the basis of the switched search condition, the search condition to the other server;

a code of the second search step of accepting the transferred search condition, generating a search module that matches the search condition, and searching a database in the other server for data;

a code of the send-back step of sending back data found in the second search step to the second server; and a code of the control step of controlling storage means to store the data found in the first search means, and the data sent back from the other server.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

Figure 1:
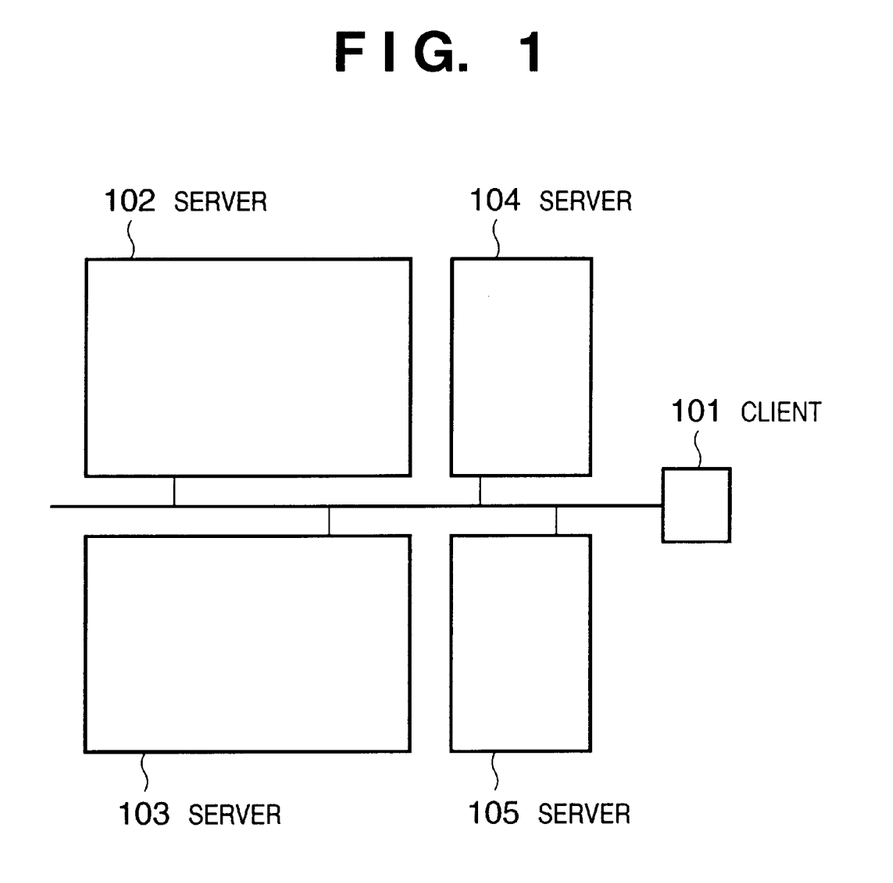
FIG. 1 is a diagram for explaining an information processing apparatus according to the present invention.
Figure 9:
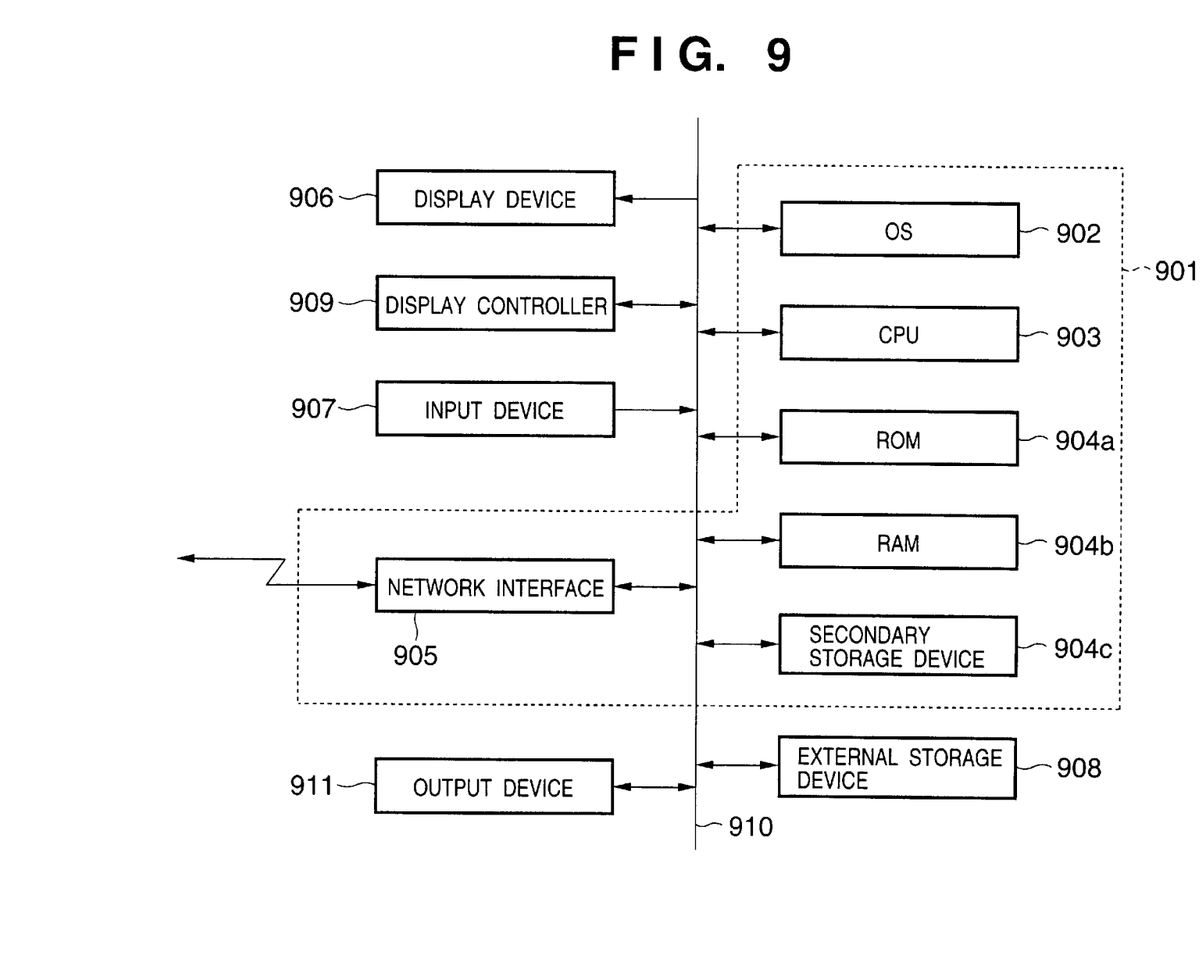
FIG. 9 is a block diagram for explaining an information processing apparatus according to the present invention.

The hardware arrangement of the present invention is based on a client (101)-server (102) system (FIG. 1). A computer comprises an operating system (OS) 902, CPU 903, memories (904a, 904b, 904c), and the like, and an input device 907 and output device 911, a display device 906, and the like are connected to the computer (FIG. 9). From the input device 907, predetermined data can be searched out, and information processing contents such as a data change request or the like can be defined.

Figure 2:
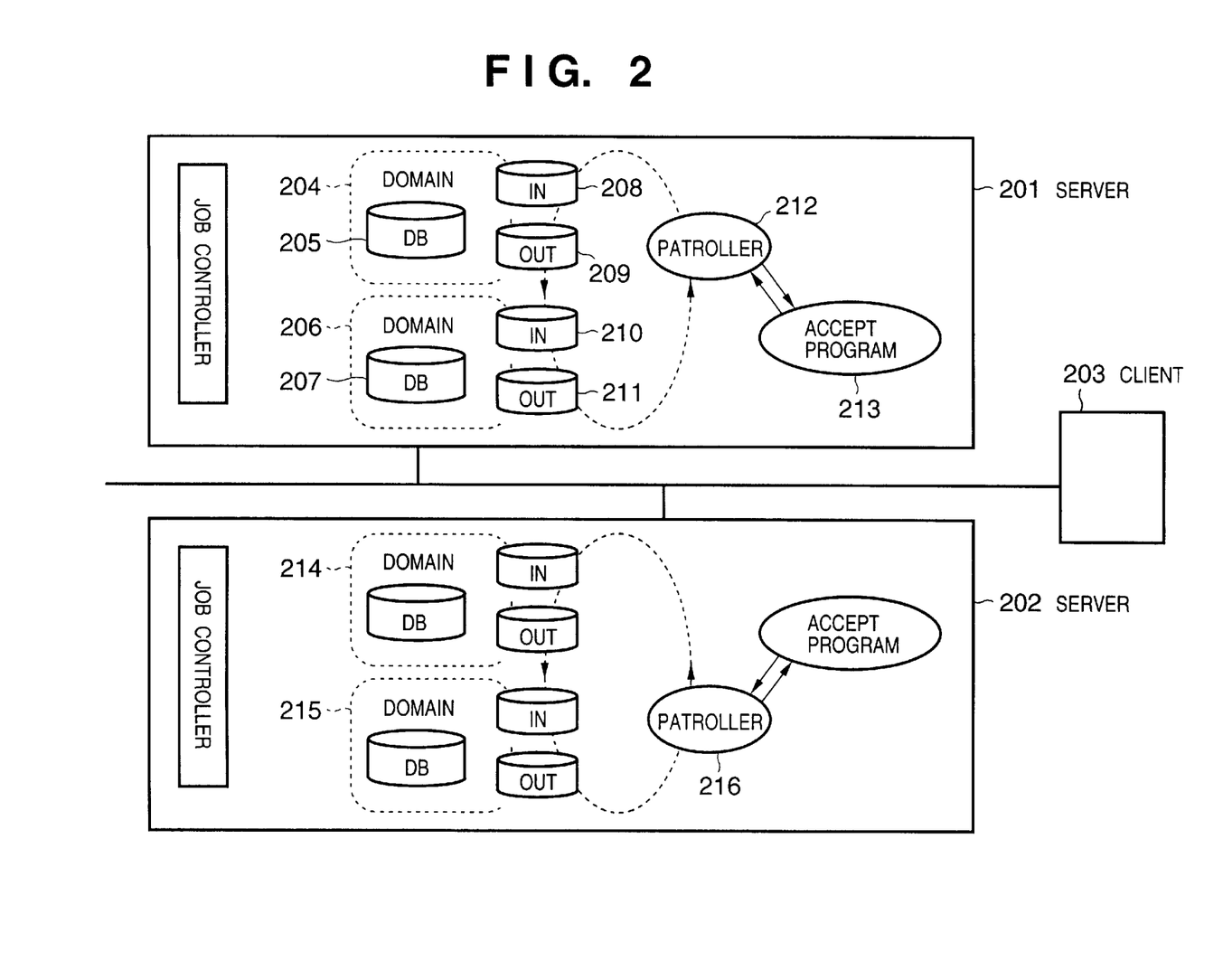
FIG. 2 is a diagram for explaining the relationship among a resident accept program, a patroller which is issued in correspondence with a given purpose, and a domain in a server.

FIG. 2 shows the relationship among a resident accept program, and a patroller and domain issued in correspondence with a given purpose in the server. Note that the "domain" in the server is a processing unit in the server, and comprises a database for executing a process. In order to execute a job input from a client 203, sub-jobs that form the job are assigned to respective domains (204, 206, 214, and 215), and are independently processed.

Each domain has a buffer (IN 208, IN 210, or the like in FIG. 2) for spooling an input job, and a buffer (OUT 209, OUT 211, or the like in FIG. 2) for spooling a job the processing of which is complete. These buffers are used to issue a request to each domain (IN), and publish information in response to that request (OUT). A job controller controls a process in response to a message fetch request or the like to a domain.

A resident accept program 213, which serves as an element of a characteristic feature of an embodiment of the present invention issues a program (to be referred to as a "patroller" hereinafter) 212 which delivers a change request of predetermined data by patrolling domains on the basis of the contents requested by a client 203 (or an accept program of another server), acquiring data that matches a predetermined condition from public information of domains, and so forth. The patroller 212 executes a process for acquiring predetermined information from domains designated as data search targets, e.g., from domains 204 and 206, or changing predetermined information in the domains (this process will be described in detail later).

Figure 11:
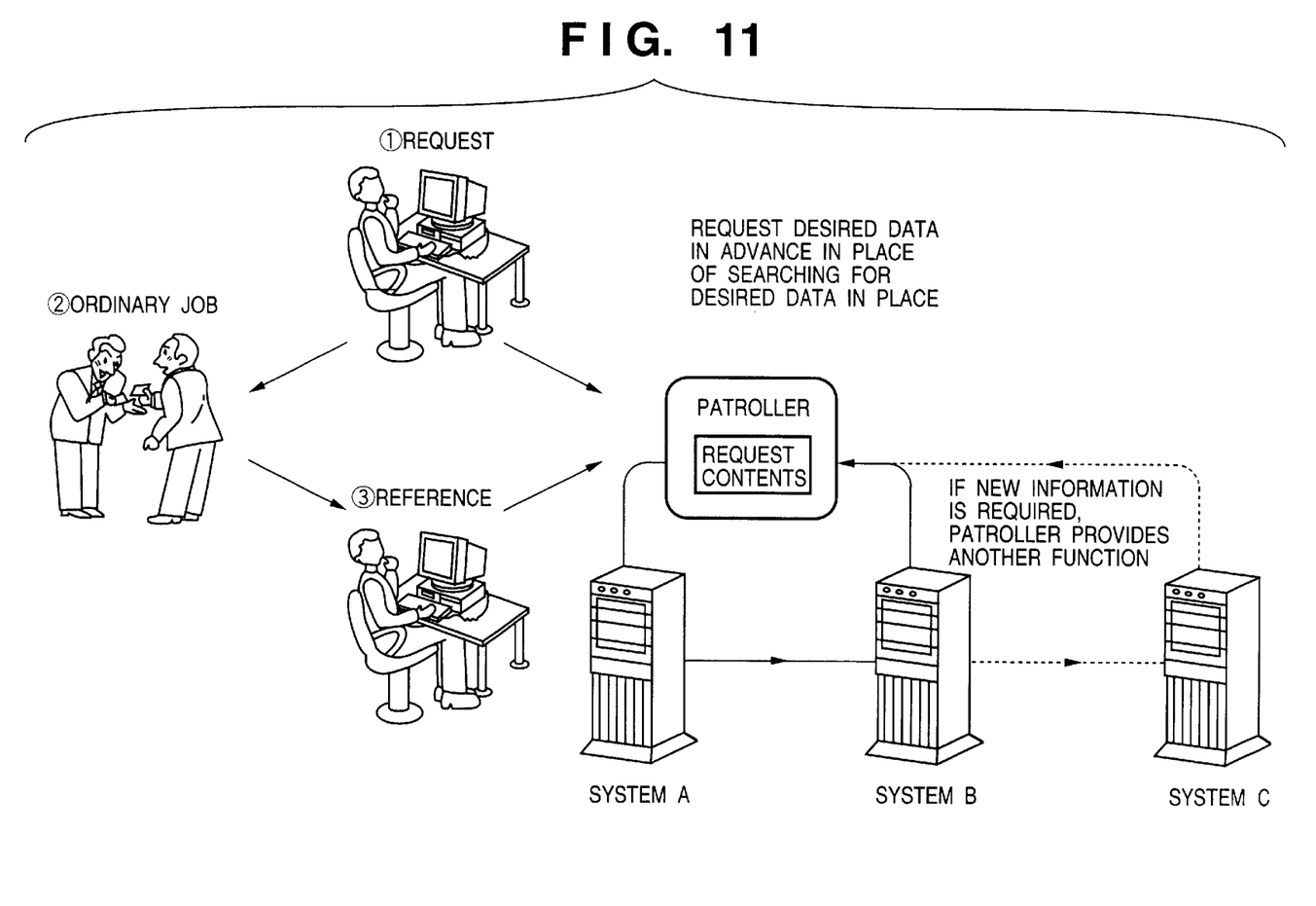
FIG. 11 is a view showing the concept of an information process according to an embodiment of the present invention using a patroller.

FIG. 11 shows the concept of an information process according to an embodiment of the present invention using the patroller. With this system, the client need not directly access individual systems A, B, and C, and can execute a flexible, very efficient information process by changing request contents (e.g., a search or change process of specific data) with respect to the patroller, and designating objects to be patrolled.

Since the patroller acquires information in correspondence with the need of a data request source on its behalf, it never collects unwanted data insignificantly.

Note that the patroller issued is not a program for executing job processes of a domain, but it operates independently of the domain processes and never intervenes in domain processes to interrupt them. When a plurality of domains are searched for given information, the patroller patrols the domains to search, acquire, and process public information of the domains, as conceptually shown in FIGS. 2 and 11.

Data exchange between the patroller and each domain is achieved using the IN and OUT serving as buffers, as described above.

The IN 208 or the like is used when the patroller requests a domain to publish data, and informs the request source of a patrol result. The OUT 209 or the like is used when a domain publishes data with respect to the patroller and outputs a processing result. Data exchange between the patroller and each domain is not limited by the locations of databases that change in accordance with the system arrangement deployed, but can be done as long as data exchange protocols in the IN and OUT match.

Figure 10A:
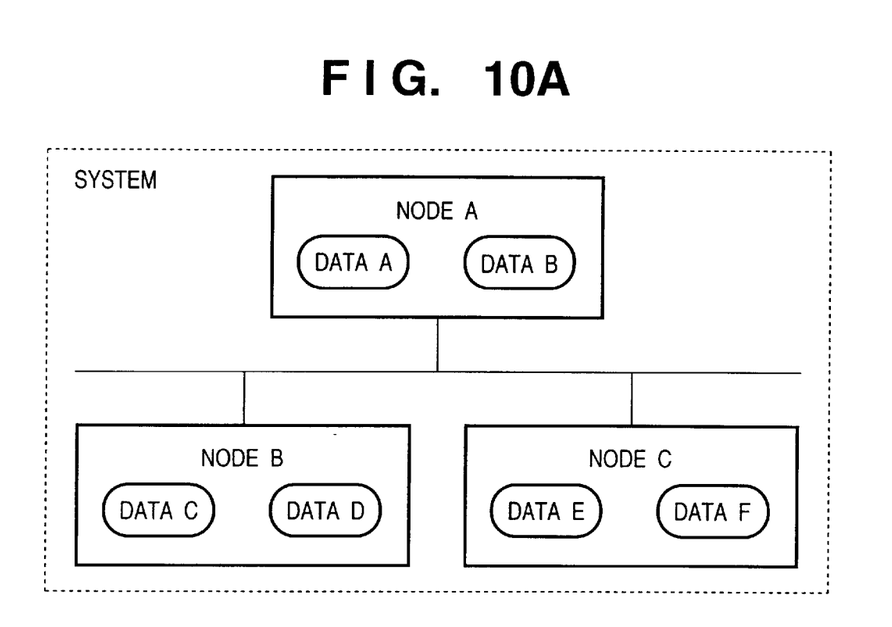
FIG. 10A is a diagram showing an arrangement in which databases are distributed to a plurality of nodes (servers) in a single system.
Figure 10B:
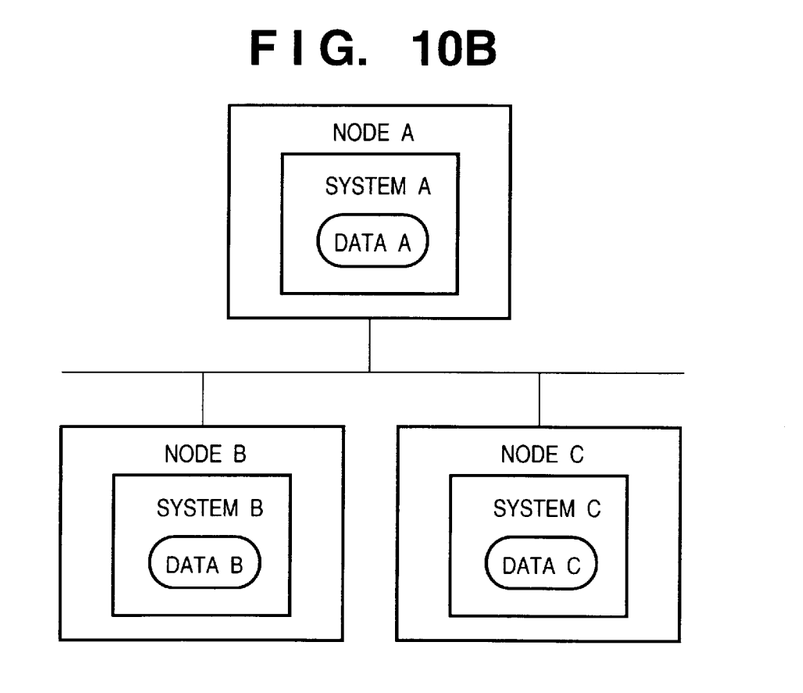
FIG. 10B is a diagram showing an arrangement in which data required by a single system are concentrated on specific nodes.

FIG. 10A shows the arrangement in which databases are distributed to a plurality of nodes (servers) in one system, and FIG. 10B shows an arrangement data required for one system are concentrated on specific nodes. That is, the arrangement data shown in FIG. 10B is managed by different structural data bases. When the patroller patrols a single system (FIG. 10A), or patrols different systems to acquire information (FIG. 10B), it can exchange information independently of the data structures of the individual systems as long as a common data exchange protocol is used.

Details of the processes of the accept program and patroller will be described below in three embodiments.

First Embodiment

Figure 3:
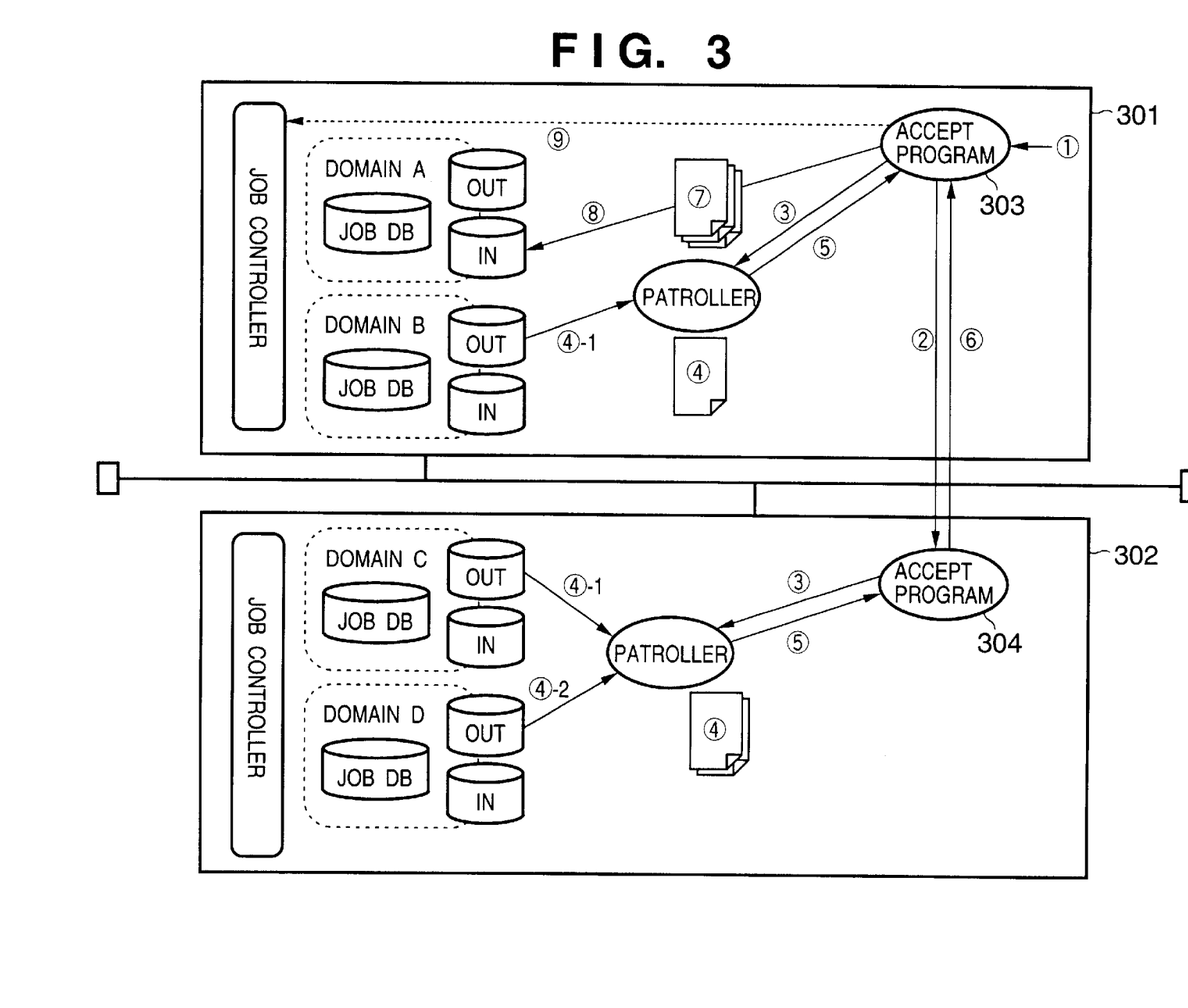
FIG. 3 is a diagram for explaining the process for informing a predetermined domain of data acquired from domains.
Figure 8:
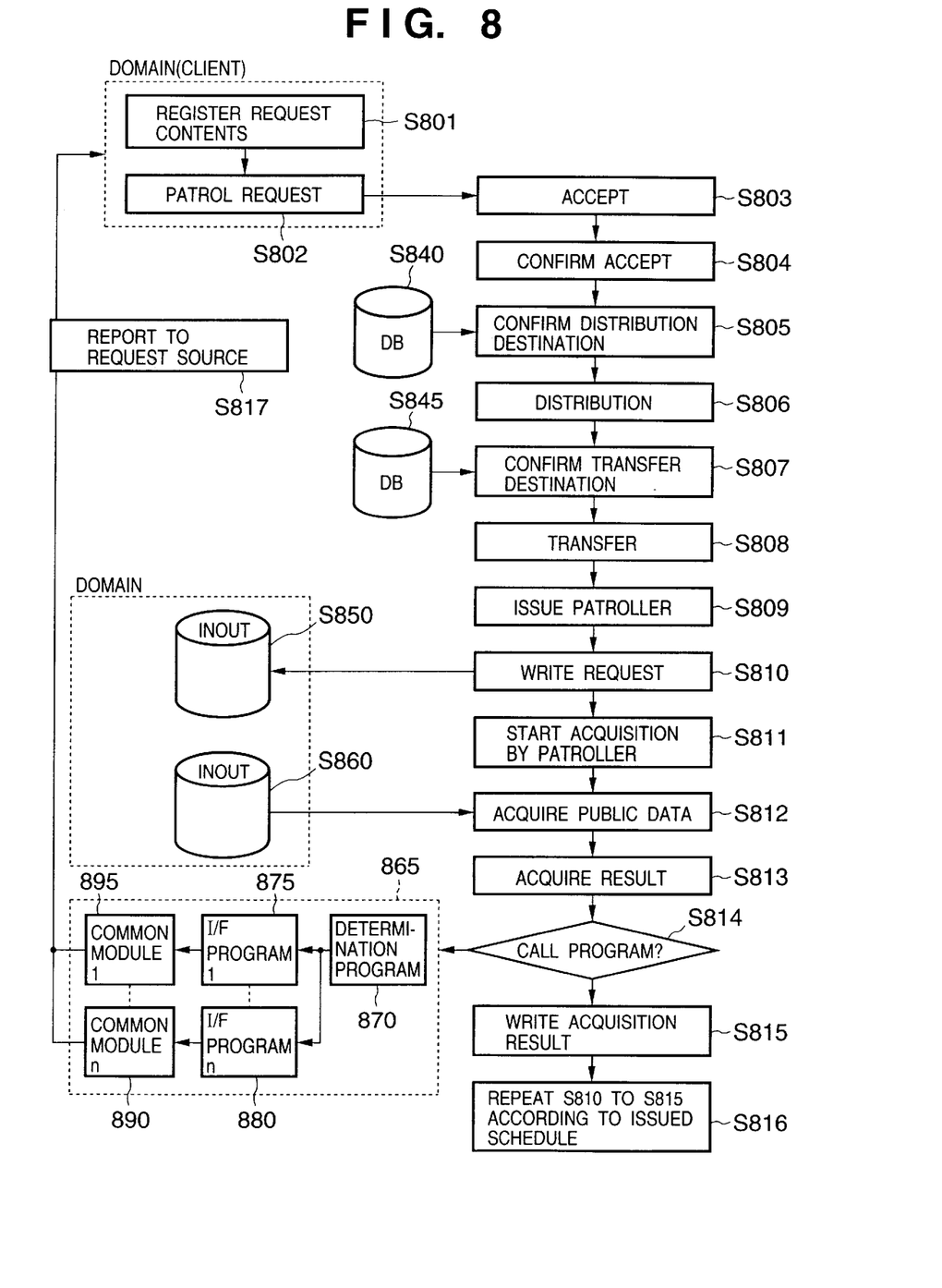
FIG. 8 is a flow chart for explaining the overall flow of processing.

FIG. 8 is a flow chart showing the overall flow of the process in an embodiment to be described below, and FIG. 3 is a diagram for explaining the process for informing a predetermined domain of data acquired from domains. In FIG. 3, the numbers in circles indicate the order of processes.

In step S801 in FIG. 8, request contents are registered. More specifically, a purpose, domain numbers used to identify domains as patrol destinations, and the domain number of a domain serving as a storage location of acquired data are designated, and a patrol cycle (a cycle at which the patroller patrols domains to search for data), a patrol pattern, purpose IDs, and the like are defined to issue a patrol request (step S802).

In step S803, the accept program of a given server checks the request contents to receive the request, and sends back its acknowledgement to the request source (step S804).

In FIG. 3, process ① corresponds to step S803, and the accept program accepts a request from the client or another domain.

In step S805 in FIG. 8, request transfer destinations are determined by looking up a destination management database (840) to search for a server including a report destination of a patrol result. For example, when a request is sent to an accept program 304 of a server 302, and designates domain A as a report destination, the patrol request is transferred to a server 301 (step S806).

In step S807, domains to be patrolled designated in the patrol request are confirmed with reference to a destination management table (845) to determine shares of patrolling (step S808).

Process ② in FIG. 3 corresponds to this process. When the designated domains are present in a plurality of servers, the accept programs are launched in correspondence with the domains of the designated patrol destinations to share the request.

In step S809, the accept program of each server issues a patroller. If there are a plurality of requests, a plurality of patrollers are launched at the same time. Process ③ in FIG. 3 corresponds to the process in step S809. If different purpose IDs are defined in process ①, different patrollers are used.

In step S810, each patroller patrols shared domains (④-1 and ④-2 in FIG. 3). The patroller makes rounds to acquire data corresponding to the purpose. Data acquisition can be achieved by reading out only information that matches a purpose from the OUT of each domain using the purpose ID given upon receiving the request. The purpose ID indicates, e.g., data search, change, and the like, and the patroller patrols the domains to acquire data in accordance with the set purpose ID (steps S811 and S812).

In step S813, the patroller of each server reports the patrol result to the accept program of the self server (process ⑤ in FIG. 3), and the distributed accept program (304) that received the report sends the result to the accept program (303) as the distribution source (process ⑥ in FIG. 3). The accept program as the distribution source arranges all the received results (process ⑦ in FIG. 3).

In step S815 (process ⑧ in FIG. 3), the final report contents are sent to the IN of the "domain" designated as the data storage location. At this time, since the purpose ID is stored together with the patrol result, the purpose of patrol can be easily understood.

In step S816 (process ⑨ in FIG. 3), the reception controller informs the job controller that a series of search processes by the patrollers and data storage have been finished.

The processes in steps S810 to S815 are repeated as one cycle in accordance with the issued schedule.

Second Embodiment

Figure 4:
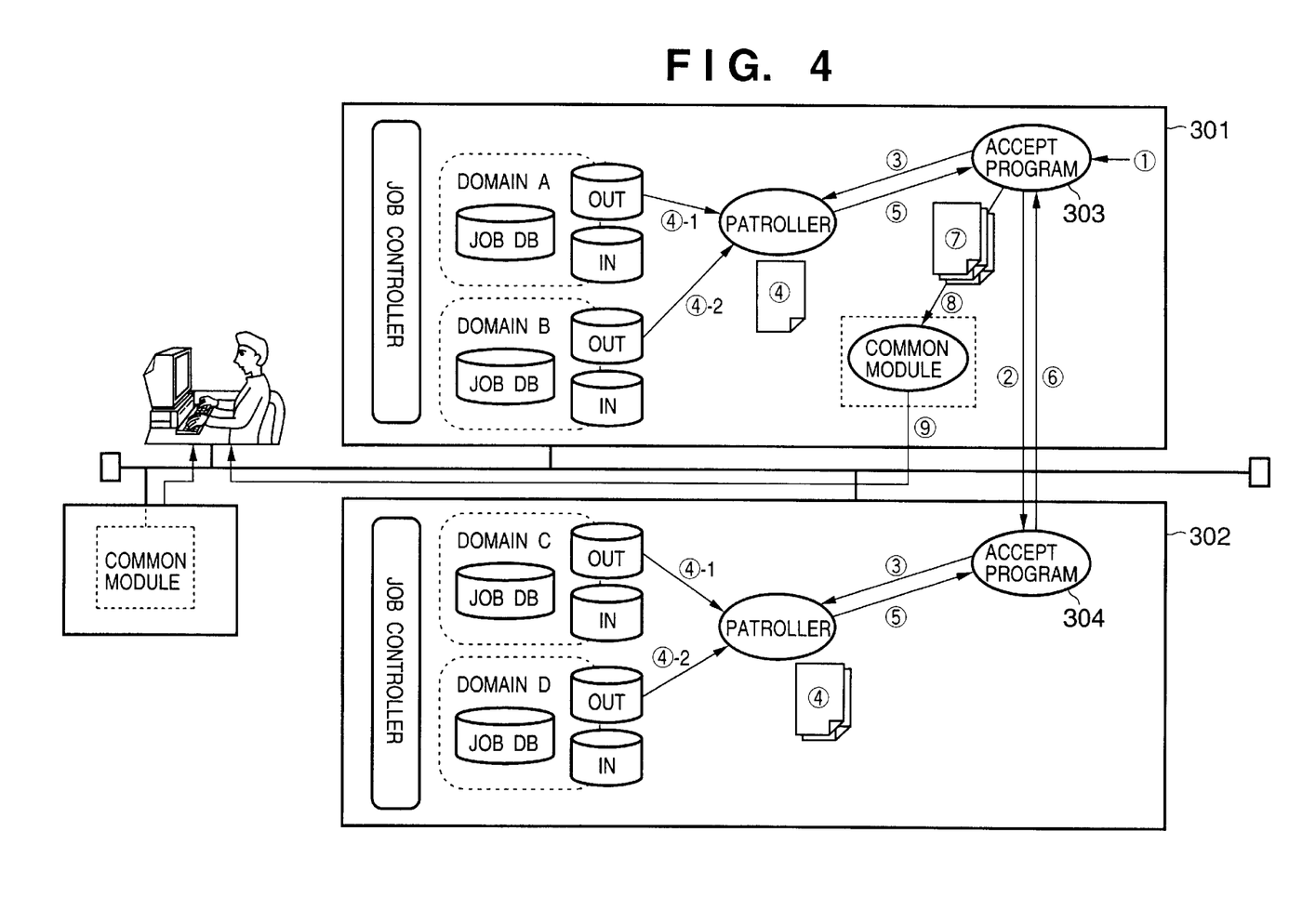
FIG. 4 is a diagram for explaining the process for reporting the search result of data acquired from a domain to an administrator.

FIG. 4 is a diagram for explaining the process for informing an administrator of the search result without storing data acquired from domains in a predetermined domain. In FIG. 4, the numbers in circles indicate the order of processes.

In processes ① to ⑦ in FIG. 4, the same processes as those in data acquisition in FIG. 3 are executed, and a patroller issued in response to a request acquires public information of domains.

In process ⑧ in FIG. 4, a program (865: FIG. 8) for storing the result found by the above search process is called, a determination program (870) launches an interface (I/F) program (875, 880) corresponding to a purpose, and the search result is passed to a common module (program module) (890, 895) as data. This process corresponds to step S814 in FIG. 8, and the location of the common module is not limited to the request source server, but common modules in other servers on the network may be used.

If there is no storage request to the common module, the process in step S814 may be skipped.

In process ⑨, the common program (program module) that received the result sends an email message to an administrator (the source request source) or the like to inform it of the result (S817).

The processes in steps S810 to S815 are repeated as one cycle in accordance with an issued schedule.

Third Embodiment

Figure 5:
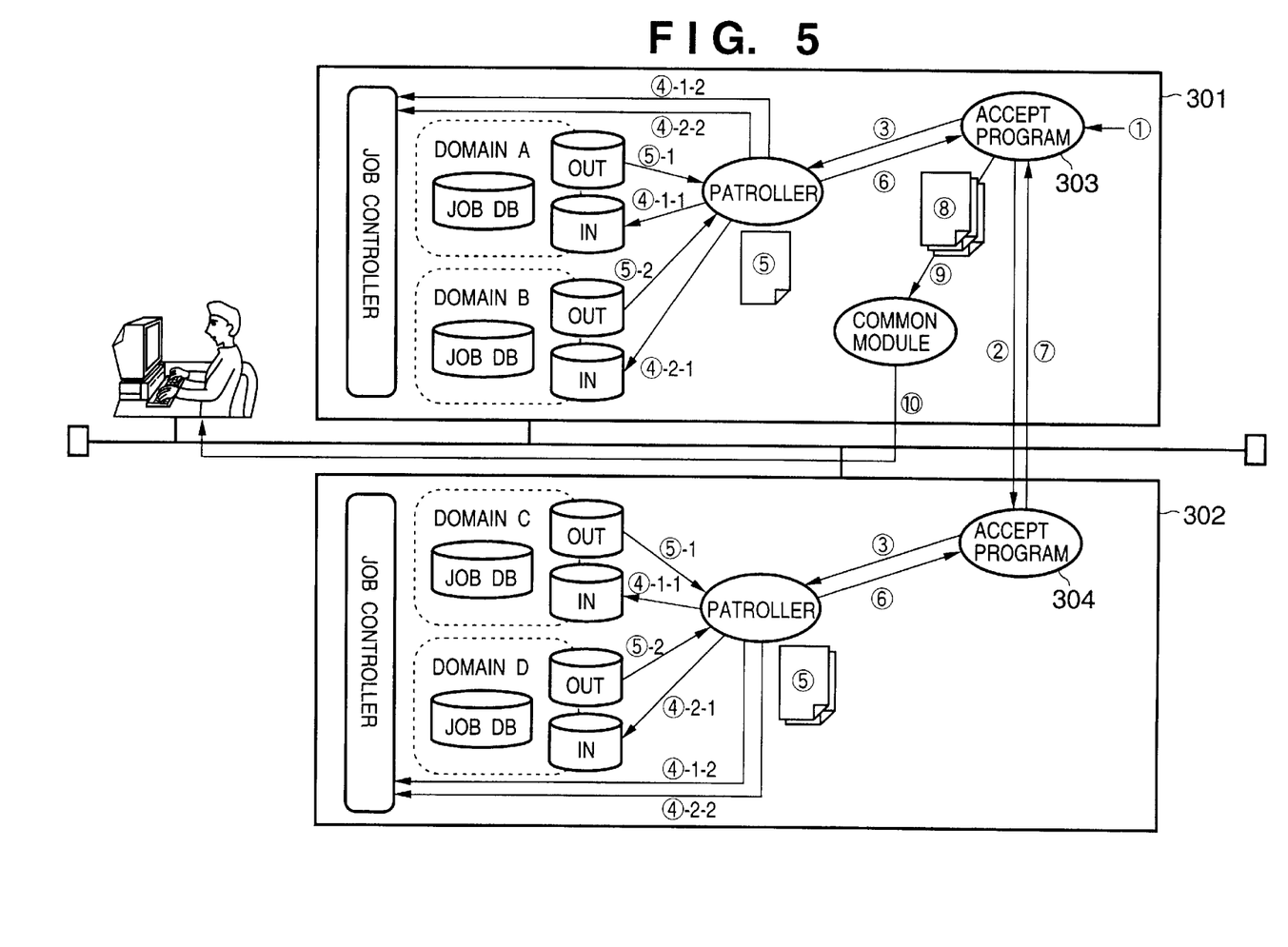
FIG. 5 is a diagram for explaining the process for acquiring information from individual domains and informing the administrator of the acquired data after an information request is delivered to the domains.

FIG. 5 is a diagram for explaining the processing sequence for acquiring information from domains and informing an administrator of the information after an information request is delivered to the domains. In FIG. 5, the numbers in circles indicate the order of processes.

In process ① in FIG. 5, the accept program accepts a request from the client or another domain (steps S801 to S804 in FIG. 8).

In the data received in this process, the domain numbers used to identify domains as patrol destinations, designation of the domain number of the storage location of acquired data, a patrol cycle, a patrol pattern, a purpose ID, request contents for domains, and the like are defined. Unlike in the first embodiment, contents for requesting to publish specific data are defined in advance.

In process ②, when the domains designated as objects which are to undergo search are present in a plurality of servers, the accept program distributes the request in units of servers in accordance with the designated domain numbers of patrol destinations (steps S805 to S808 in FIG. 8).

In process ③, the accept program of each server issues a patroller that processes the request (step S809 in FIG. 8). If different purpose IDs are defined in process ①, different patrollers are used. Processes ② and ③ described above are the same as in the first embodiment.

In process ④ (a request message is written in the IN in process ④-$X_{=1.2}$-1, and a message fetch request is issued to the job controller in ④-$X_{=1.2}$-2), the patroller patrols the designated domains, and informs the domains as the patrol destinations of the request contents issued from the request source. This process corresponds to write of a request in step S810 in FIG. 8, and the request is written in the IN of each domain.

Figure 6:
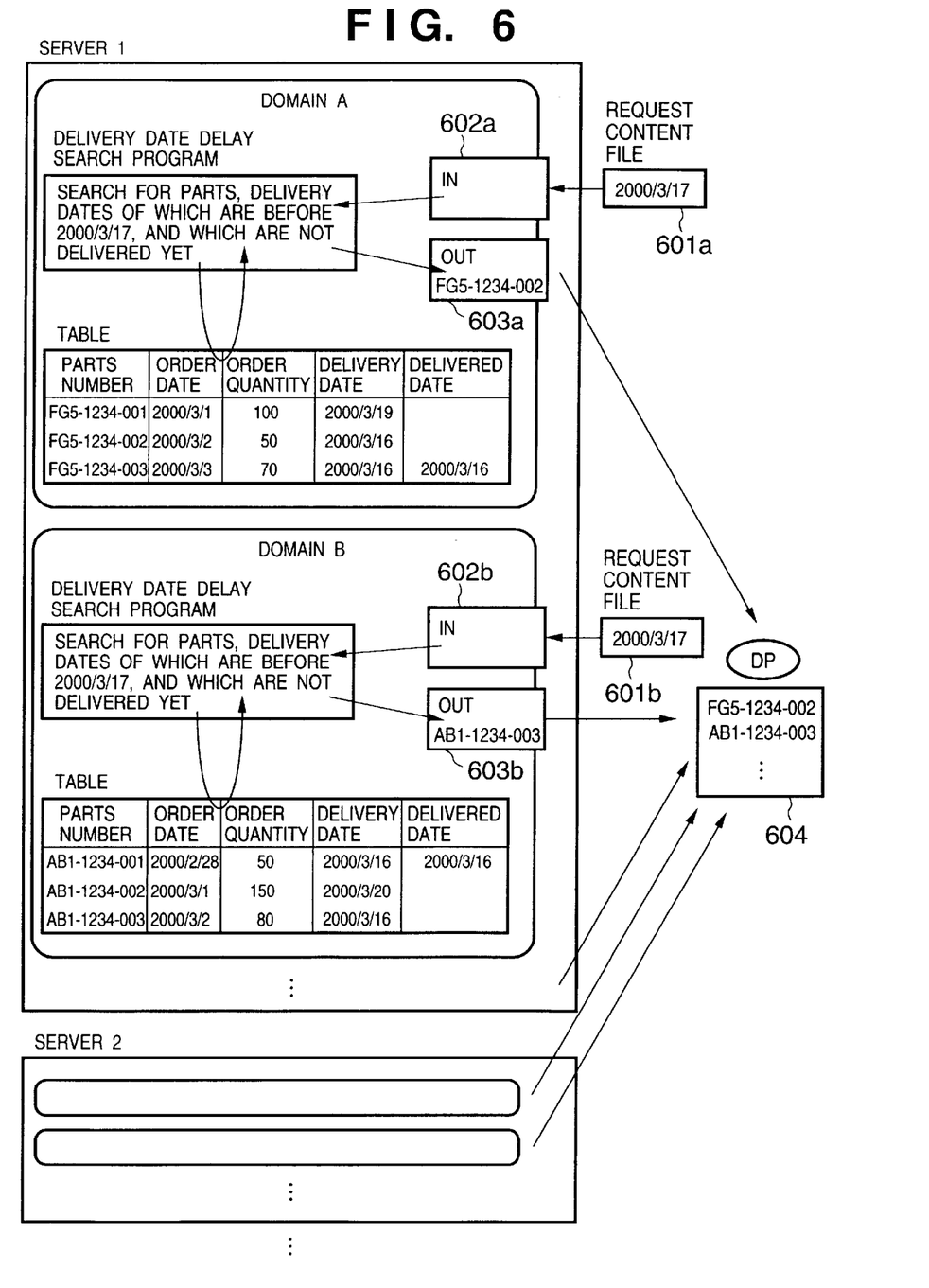
FIG. 6 is a view for explaining a search example of production management information.

For example, if "search" is designated in the request contents, and corresponding data is found in the database of a given domain using a search key condition as a parameter, that data is requested to be published. FIG. 6 shows a search example of production management information when the request contents include a predetermined date as a delivery date. In FIG. 6, request contents files 601a and 601b are key information as search requests from the request source, and the patroller delivers search requests based on the key information to domains (A, B, and the like) which are to undergo search. Each domain receives the request by an IN 602a or 602b, and starts its internal process based on that request. For example, the domain searches the database for information that pertains to orders and deliveries of parts, and outputs (publishes) the found data to an OUT 603a or 603b. Data found by domain A is "FG5-1234-002", data found by domain B is "AB-1234-003", and the patroller acquires and collects these output data from the OUTs.

Figure 7:
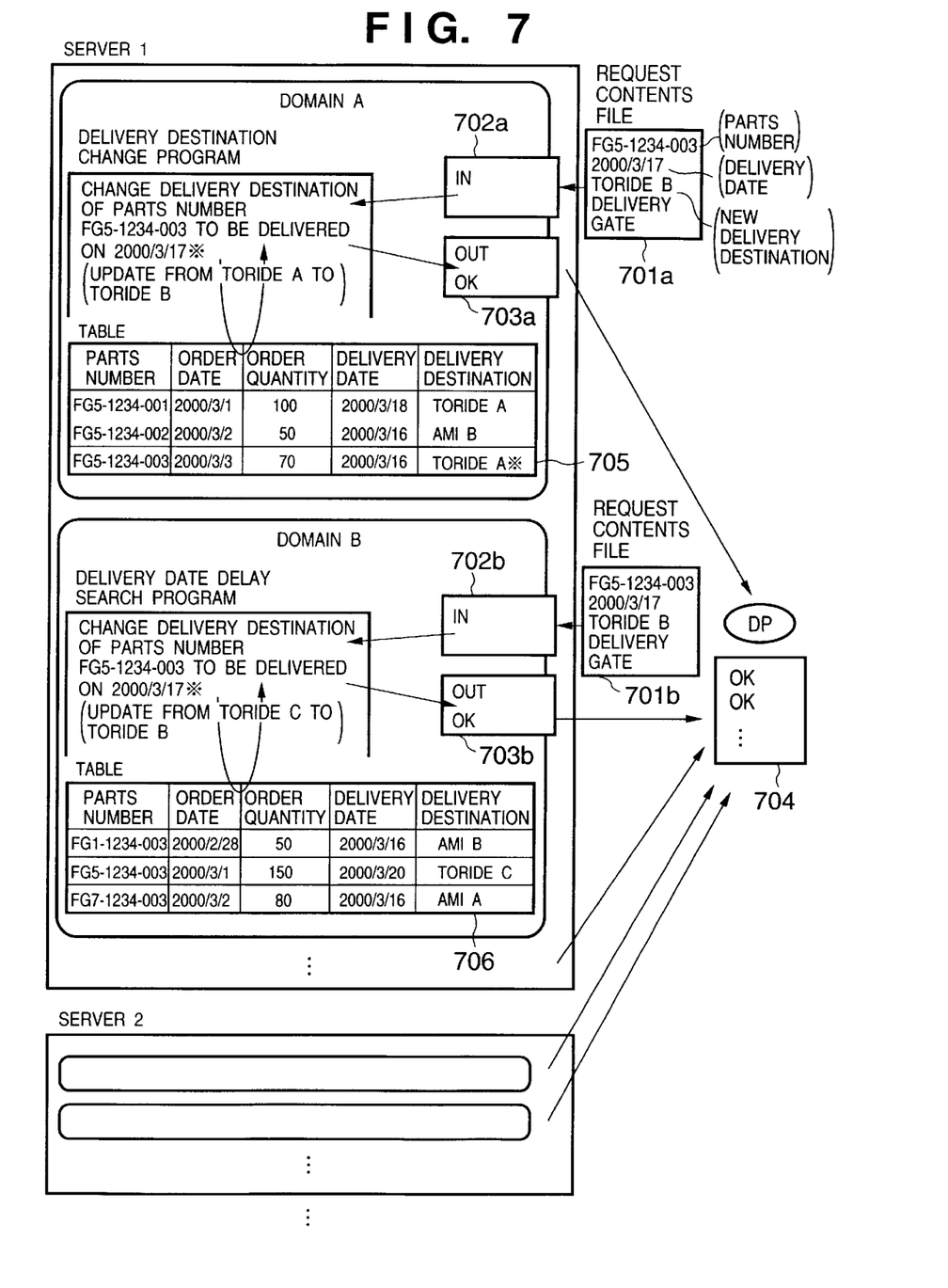
FIG. 7 is a view for explaining an example of a change process of domain data.

FIG. 7 shows an example of a domain data change process. Request contents files 701a and 701b are change requests from the request source, and designate the parts number, delivery date, and a new delivery destination. The patroller delivers the designated change contents to domains (A, B, and the like). Each domain receives the request by an IN 702a or 702b, and starts its internal process based on the request.

For example, in case of domain A, the delivery destination in a table 705 is updated from "Toride A" to "Toride B", and the delivery date is changed from "Mar. 16, 2000" to "March 17". Upon completion of the process, domain A outputs an update completion message "OK" to an OUT 703a.

Likewise, in case of domain B, the delivery destination in a table 706 is updated from "Toride C" to "Toride B", and the delivery date is changed from "Mar. 20, 2000" to "March 17". Upon completion of the process, domain B outputs an update completion message "OK" to an OUT 703b.

If there is no data write request, the process in step S810 may be skipped.

In process ⑤, the patroller acquires output data from the OUT of each domain (704: FIG. 7), and this result is used as a patrol completion report to the accept program.

The accept program (304) to which the request has been distributed sends the result to the accept program as the distribution source (process ⑦), and the accept program (303) as the distribution source arranges all the received results (process ⑧). The processes in processes ⑤ to ⑧ correspond to step S813 in FIG. 8.

In process ⑨ in FIG. 5, a program for processing a result report is called, a determination program launches an interface (I/F) program corresponding to the purpose, and the search result is passed to a common module. This process corresponds to step S814 in FIG. 8 (the process has already been explained in detail in the second embodiment, and a description thereof will be omitted).

In process ⑩ in FIG. 5, the common module that received the search result sends email message to an administrator to report the result to him or her, thus ending the process (step S817 in FIG. 8). The processes in steps S810 to S815 are repeated as one cycle in accordance with the issued schedule.

As described above, in the first to third embodiments, according to the system management using the accept program and patroller, only required data can be efficiently retrieved or changed from or in distributed databases.

Other Embodiments

Note that the present invention may be applied to either a system constituted by a plurality of devices, or an apparatus consisting of a single equipment.

The objects of the present invention are also achieved by supplying a storage medium (or recording medium), which records a program code of a software program that can implement the functions of the above-mentioned embodiments to the system or apparatus, and reading out and executing the program code stored in the storage medium by a computer (or a CPU or MPU) of the system or apparatus. In this case, the program code itself read out from the storage medium implements the functions of the above-mentioned embodiments, and the storage medium which stores the program code constitutes the present invention. The functions of the above-mentioned embodiments may be implemented not only by executing the readout program code by the computer but also by some or all of actual processing operations executed by an operating system (OS) running on the computer on the basis of an instruction of the program code.

Furthermore, the functions of the above-mentioned embodiments may be implemented by some or all of actual processing operations executed by a CPU or the like arranged in a function extension card or a function extension unit, which is inserted in or connected to the computer, after the program code read out from the storage medium is written in a memory of the extension card or unit.

When the present invention is applied to the storage medium, the storage medium stores program codes corresponding to the aforementioned flow charts (shown in FIGS. 3 to 5 and/or FIG. 8).

As many apparently widely different embodiments of the present invention can be made without departing from the spirit and scope thereof, it is to be understood that the invention is not limited to the specific embodiments thereof except as defined in the claims.

What is claimed is:

1. An information processing apparatus for searching a first database and a second database for data, comprising:

accept means for accepting a search condition;

generating means for generating a search module that matches the received search condition;

control means for storing the search module generated by said generating means in a first input storage means of the first database and a second input storage means of the second database, used as an input buffer of each database;

first and second searching means for searching the first database and second database for data on the basis of the search modules stored in said first input storage means and said second input storage means, and for storing search results searched in a first output storage means of said first database and a second output storage means of said second database, used as an output buffer of each database; and acquirement means for acquiring the search results from said first output storage means and said second output storage means to output as the search results corresponding to the search condition.

2. The apparatus according to claim 1, further comprising:

transferring control means for, when the accepted search condition is a search condition transferred from another server, transferring the search result acquired by said acquirement means to the another server.

3. An information processing system for searching a plurality of databases for data, comprising:

a first server having a first database and a second database;

a second server having a third database;

input means for inputting a search condition for selecting a database and searching the selected database;

determining means for determining the search condition to be sent to said first server and/or said second server on the basis of the input search condition;

first transfer means for transferring the search condition to said first server and/or said second server on the basis of the determination result;

second transfer means for receiving the transferred search condition transferred by said first transfer means, and transferring the transferred search condition from said first server to said second server;

first generating means for generating a first search module, that matches the transferred search condition in order to search the first database and the second databases;

first control means for storing the first search module generated by said first generating means in a first input storage means and a second input storage means used as an input buffer of each, database of said first server;

first and second searching means for searching said first database and said second database for data on the basis of the first search modules stored in the first output storage means and the second input means, and for storing a search result searched in a first output storage means and a second output storage means, used as an output buffer of each database of said first server;

second generating means for generating a second search module, that matches the transferred search condition in order to search the third database;

second control means for storing the second search module generating by said second generating means in a third input storage means used as an input buffer of the third database of said second server;

third searching means for searching said third database for data on the basis of the second search module stored in the third input storage means, and for storing a search result in a third output storage means used as an output buffer of the third database of said second server;

third transfer means for transferring the search result stored in said third output storage means to said first server; and acquirement means for acquiring the search results stored in said output storage means and said second output storage means of said first server and the search result transferred by said third transfer means in order to output as the search results corresponding to the search condition.

4. The system according to claim 3 further comprising:

specifying means in the first server for specifying a server, that saves and manages a search result, on the basis of the accepted search condition;

transferring means for, when the first server is different from the specified server that saves and manages the search result, transferring the search condition to a second server that saves and manages a search result.

5. The apparatus according to claim 1, wherein the search module is generated for each search condition, and said searching means of a server defined by the search condition searches a database for data.

6. The apparatus according to claim 1, wherein when the search condition designates a change process of data, said generating means generates the search module as a change request of that data, and said acquirement means acquires identification information indicating completion of the change process as a search result.

7. The apparatus according to claim 1, wherein when the search condition designates a search process of data, said generating means generates the search module as a publish request of that data, and said acquirement means acquires public information in response to the publish request as a search result.

8. An information processing method for searching a first database and a second database for data, comprising:

the accept step of accepting a search condition;

the generating step of generating a search module that matches the received search condition;

the first control step of storing the search module generated in said generating step in a first input storage means of the first database and a second input storage means of the second database, used as an input buffer of each database;

the first and second step of searching the first database and second database for data on the basis of the search modules stored in said first input storage means and said second input storage means, and of storing search results searched in a first output storage means of said first database and a second output storage means of said second database, used as an output buffer of each database; and the acquirement step of acquiring the search results from said first output storage means and said second output storage means to output as the search results corresponding to the search condition.

9. The method according to claim 8, further comprising:

the transferring control step of transferring, when the accepted search condition is a search condition transferred from another server, the search result acquired by said acquirement step to the server.

10. The method according to claim 8, wherein the search module is generated for each search condition, and said searching step on a server defined by the search condition searches a database for a data.

11. The method according to claim 8, wherein when the search condition designates a change process of data, said generating step generates the search module as a change request of that data, and said acquirement step acquires identification information indicating completion of the change process as a search result.

12. The method according to claim 8, wherein when the search condition designates a search process of data, said generating step generates the search module as a publish request of that data, and said acquirement step acquires public information in response to the publish request as a search result.

13. The apparatus according to claim 1, further comprising:

specifying means for specifying a server, that saves and manages the search result, on the basis of the accept search condition; and transferring means for, when the specified server that saves and manages the search result is different from the self server, transferring the search condition to another server that saves end manages a search result.

14. The method according to claim 8, further comprising:

the specifying step of specifying a server, that saves and manages the search result, on the basis of the accepted search condition; and the transferring step of transferring, when the specified server that saves and manages the search result is different from the self server, the search condition to another server that saves and manages a search result.

15. A storage medium which stores a program code for making a computer implement an information processing method for searching a first database and a second database for data, said program code comprising:

a code of the accept step of accepting a search condition;

a code of the generating step of generating a search module that matches the received search condition;

a code of the control step of storing the search module generated by said code of the generating step in a first input storage means of the first database and a second input storage means of the second database, used as an input buffer of each database;

a code of the first and second searching step of searching the first database and second database for data on the basis of the search modules stored in said first input storage means and said second input storage means and of storing search results; searched in a first output storage means of said first database and a second output storage means of said second database, used as an output buffer of each database;

a code of the acquirement step of acquiring the search results from said first output storage means and said second output storage means to output as the search results corresponding to the search condition.

16. The storage medium according to claim 15, further comprising:

a code of the transferring control step of transferring, when the accepted search condition is a search condition transferred from another server, the search result acquired by said acquirement step to the server.

* * * * *